June 24, 1958     P. MARTIN     2,839,864
HANDLES FOR IMPLEMENTS
Filed July 30, 1954

INVENTOR.
Paul Martin,
BY Behr & Leonard,
his ATTORNEYS.

United States Patent Office 2,839,864
Patented June 24, 1958

2,839,864

HANDLES FOR IMPLEMENTS

Paul Martin, Cleveland, Ohio, assignor to himself as trustee

Application July 30, 1954, Serial No. 446,720

7 Claims. (Cl. 43—23)

This invention relates to handles for implements, to groups of disassembled components therefor, and to a method of making handles from the group components.

For implements used in sports, such as fishing poles and the like, the handle generally is subjected to rather severe usage such as alternate wetting or soaking with water and heating by exposure directly to intense sunshine.

Wooden handles and the like tend to crack and deteriorate under such conditions. Cork covered handles tend to peel. In the case of handles coated with plastic there is a tendency under the normal heating and cooling in use for the plastic to expand and contract and, consequently, to become separated from the underlying core portion.

In order to overcome the disadvantages of the prior handles attempts have been made to form the handles by assembling thin sheets of self-supporting material in a row endwise of the handle in face to face relation and then grinding down the assembled sheets edgewise of the sheets to form the desired external contour. The latter type of handle is quite satisfactory in use but very expensive. Furthermore, it is impossible to obtain on such a handle the type of high gloss surface that can be provided by molding.

In accordance with the present invention, a handle is provided which can withstand the severe uses to which it is subjected in normal use.

Further, the invention resides in the provision of a group of disassembled components which can readily be assembled into a handle either commercially or by the ultimate user and without skilled labor.

Various objects and advantages of the present invention will become apparent from the following description in which reference is made to the drawings illustrating a casting rod handle embodying the principles of the present invention, and in which—

Figure 1:
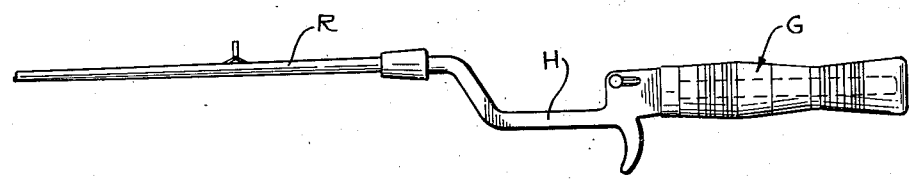
Figure 1 is a fragmentary side elevation of a casting rod with the handle of the present invention installed thereon.

Referring to the drawings there is shown in Figure 1 a casting rod R having a handle H with a conventional type of securing means for connecting a fishing reel thereto and with a hand grip portion G with which the present invention is particularly concerned.

Figure 2:
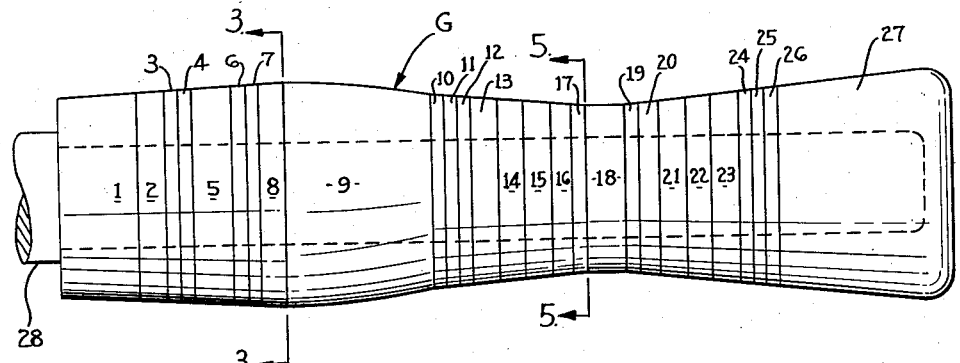
Figure 2 is an enlarged fragmentary side elevation of the handle illustrated in Figure 1.

As better illustrated in Figure 2, the hand grip portion G comprises a plurality of relatively thin discs of synthetic plastic material such as the cellulose acetate, acylic resin, or any of the thermo-plastic or thermo-setting organic materials.

Such handles generally are externally contoured so as to have different diameters at different portions along their length with the changes in diameter from one portion to the other being gradual. Accordingly, the discs are made frusto-conical in shape and are such that, when arranged in a row in face to face relation in the proper order and alignment, they can be held together in assembled relation to provide a handle grip portion which, in its preferred form, is of varying diameter at different portions along its length.

In the form illustrated in Figure 2, the hand grip portion G, with the core omitted, is annular in cross section and thus each disc is essentially a frusto-conical annulus.

Since the radii of curvature of the lateral boundaries of the longitudinal section of the handle are relatively long, the discs may be true frusto-conical segments, the peripheral surfaces having no curvature axially, thus greatly reducing die cost.

The discs are separately molded to the exact size and shape required so that the peripheral surface of each disc has the original high gloss molded finish imparted by the original molding operation.

Some of the discs are different colors from the others depending on the color arrangement and design required.

Each disc has on at least one face an ordinal symbol indicating its order in the row forming the hand grip portion G.

In the form illustrated in Figure 2, twenty-six such discs are provided, these discs being indicated consecutively from left to right as numbers 1 through 26, respectively. An end member or cap 27 is provided for the butt end of the handle. The central opening of each of the discs is such as to receive and snugly accommodate a central core portion 28 of the handle H.

In many instances, duplicates of the same disc can be used in two different positions along the row but facing in a different direction endwise of the row in one position than it does in the other.

Figure 3:
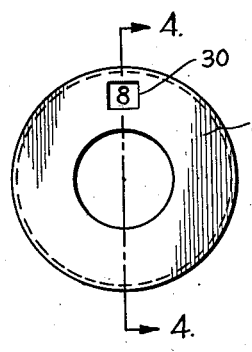
Figure 3 is a right end elevation of one of the discs of which the present handle is formed, viewed along line 3—3 in Figure 2.
Figure 4:
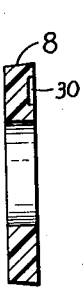
Figure 4 is a cross sectional view of the disc illustrated in Figure 3 and is taken on line 4—4 of Figure 3.

As mentioned, all of the discs have an ordinal symbol. Referring for example, to the disc 8 illustrated in Figure 3, it has provided on one of its faces an ordinal symbol 30 which in the form shown, is a numeral 8. This numeral is on the face of the disc 8 facing toward a predetermined end of the handle grip portion G—the right hand end in Figure 2. Correspondingly each of the discs 1 through 26 bears its ordinal symbol on the face facing the same end of the handle—the right hand end in the illustration, when the discs are facing in the proper direction. These ordinal and position-indicating symbols are the numerals 1 through 26 inclusive, respectively.

To assemble the handle, it is only necessary to slide on to the member 28 or onto a suitable assembly rod or jig the various discs in the order of the numerals on their faces when the numerals are turned so that the symbols 30 on the discs all face in the proper direction endwise of the handle.

Figure 5:
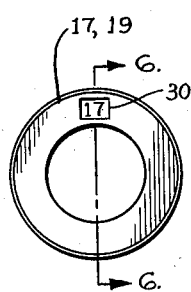
Figure 5 is a right end elevation of another one of the discs of which the handle is formed, viewed as indicated by the line 5—5 of Figure 2.
Figure 6:
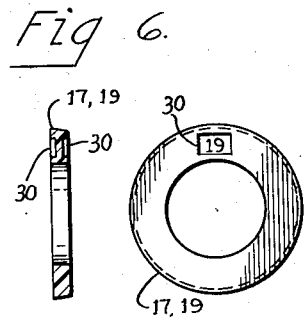
Figure 6 is a cross sectional view of the discs illustrated in Figure 5 and is taken on the line 6—6 of Figure 5.
Figure 7:
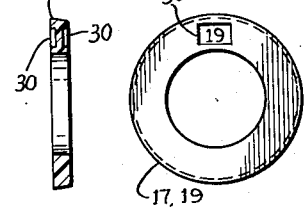
Figure 7 is a left end elevation of the disc illustrated in Figure 5.

In some instances, the same disc can be used more than one place though when so used, it usually must be turned so as to face in an opposite direction. For example, the disc 17 and the disc 19 are duplicates. However, the disc 17 is arranged with its smaller base toward the butt end or right hand end of the handle whereas the disc 19 is arranged with its larger base toward the butt end of the handle. In order to eliminate the duplication of a considerable number of discs some of the discs have in addition to the ordinal symbol on the one face, a different ordinal symbol on the opposite face. Thus, referring to Figures 5 through 7, there is shown a disc 17 which in assembled position, has its smaller diameter base facing toward the right hand end of the handle. This smaller diameter base bears the symbol 17 thus showing that the disc is seventeenth in the row and that in this order its smaller base faces toward the right hand end of the handle. However, as illustrated in Figure 7, the same disc has on its larger diameter base the symbol 19 indicating that it is used also as the nineteenth in the row but in this order its larger base, instead of its smaller base, faces toward the right hand end of the handle. Thus, for any given design of handle required, a minimum number of different discs is used so that the cost of molds is considerably reduced. At the same time, provision is made for eliminating any reasonable error in making a proper assemblage of the discs.

In order to provide a large number of different designs, quantities of each one of the discs may be made in several colors. Thus many changes can be made in the striated color design but in all of the designs, the order of the discs, as indicated by the symbols 30, is maintained.

In assembling the discs, it is usuallly desirable to start by placing disc 1 in its final position, wherein its symbol faces to the right, on the core member 28 or on a spindle or jig corresponding to the core member.

A solvent for the organic material or settable cement is applied to the right hand face of disc 1 before or after its installation on the core member or such may be applied only to the succeeding disc. Disc 2 is then assembled with its symbol 2 facing to the right, solvent or cement being provided on the left hand face of disc 2, and disc 3 is correspondingly assembled, this continuing progressively from the first disc to the final disc 26 and then the cap 27.

None of the cement or solvent touches the peripheral surfaces of the discs and accordingly, the original molding high gloss finish is retained. The molds for the individual discs are made precisely with due allowance for shrinkage during molding so that when finished, the outer surface of the assembled handle is substantially smooth and free from any abrupt breaks at the junctures of adjacent discs. In making the molds allowance must be made for differences in shrinkage of the discs where molded, due to differences in axial and radial thickness of the material.

The handle when completed has distinct advantages in that it does not deteriorate or become disassembled due to expansion and contraction, is extremely rugged, and is not damaged by exposure to water, sunlight and heat. Furthermore, in the case of damage by burning, cutting or the like, the entire handle does not have to be discarded but it can be removed from the member 28 and the damaged discs removed and replaced and the handle reassembled.

Having thus described my invention, I claim:

1. A handle comprising an elongated core member, a plurality of individually molded synthetic plastic frusto-conical discs each having an original high gloss molded peripheral surface, each disc having an axial passage snugly accommodating the core member, some of the discs being different in color than others of the discs, said discs being arranged in a row on said member in predetermined order and each with its ends in face to face relationship to those next adjacent to it, each disc having on at least one of its abutting end surfaces an ordinal symbol indicating its proper order in the row relative to the others, and all of said symbols facing toward the same end of the row when the discs are in properly assembled relation on the core, and an end element on the butt end of the core at the end of the row.

2. A handle according to claim 1 characterized in that each of said discs is bonded at its end surfaces to those discs next adjacent to it.

3. A handle according to claim 1 characterized in that some of said discs are, in shape, duplicates of others, the duplicate discs of each pair have their larger ends facing towards opposite ends of the row, and each duplicate having an additional ordinal symbol on the other one of its abutting end surfaces indicating its second position, and said other end surface facing toward said end of the row when the disc is placed in the row in the order indicated by the additional ordinal symbol.

4. A handle grip component comprising a plurality of individually molded synthetic plastic frusto-conical discs each having an original high gloss molded peripheral surface, said discs having axial passages, respectively adapted to snugly accommodate an elongated core member, said discs being arrangeable in a row on said member in predetermined order and each with its ends in face to face relationship to those next adjacent to it, some of the discs being different in color than others of the discs, each disc having on at least one of its abutting end surfaces an ordinal symbol indicating its proper position in the row relative to the others, and each of said symbols being placed on a predetermined end surface of its disc such that, in proper assembly of the discs, the symbols will face toward the same end of the row.

5. A hand grip component according to claim 4 characterized in that some of said discs are duplicates of others, the duplicate discs of each pair having their larger ends facing towards opposite ends of the row respectively, and each duplicate disc having an additional ordinal symbol on its other abutting end surface indicating its second position, and said other end surface facing toward said same end of the row when the disc is placed in the row in the order indicated by the additional ordinal symbol.

6. The method of making a handle grip comprising molding a plurality of synthetic plastic annular frusto-conical discs of predetermined size, each with a high gloss finish on its peripheral surface and with ordinal and positional symbol means on at least one base and such that the discs, if assembled in coaxial relation in the order indicated by the symbols and with the symbols facing in the same direction, will provide a handle-grip of predetermined shape, assembling said discs in the order and position indicated by the symbols, and securing them fixedly in said position.

7. The method according to claim 6 characterized in that some of said discs are molded with ordinal and positioning means on the other base different from the ordinal and positioning means on the one base, and, during assembly, are used in another order with the additional symbol facing in said same direction.

References Cited in the file of this patent

UNITED STATES PATENTS

| 433,284 | Gould | July 29, 1890 |
| 1,931,303 | Sturgis | Oct. 17, 1933 |
| 2,177,433 | Hedge | Oct. 24, 1939 |
| 2,350,494 | Champlin et al. | June 6, 1944 |
| 2,423,640 | Dally | July 8, 1947 |

FOREIGN PATENTS

| 127,381 | Great Britain | Apr. 22, 1948 |

OTHER REFERENCES

Popular Science Magazine, vol. 149, page 151, November 1946.